United States Patent [19]
Han et al.

[11] Patent Number: 5,236,249
[45] Date of Patent: Aug. 17, 1993

[54] WHEEL ASSEMBLY HINGED HEAT SHIELD

[75] Inventors: Benjamin C. Han; Joseph A. Sipocz, both of South Bend; Donald G. Roulett, Granger, all of Ind.

[73] Assignee: Allied-Signal Inc., Morristown, N.J.

[21] Appl. No.: 741,701

[22] Filed: Aug. 7, 1991

[51] Int. Cl.$^5$ .............................................. B60B 19/00
[52] U.S. Cl. ...................................... 301/6.91; 301/6.1
[58] Field of Search ...................... 188/264 R, 264 G; 301/6.1, 6.2, 6.3, 6.91

[56] References Cited

U.S. PATENT DOCUMENTS

| 3,754,624 | 8/1973 | Eldred | 188/264 G X |
| 3,958,833 | 5/1976 | Stanton | 301/6 WB |
| 4,017,123 | 4/1977 | Horner et al. | 188/264 G X |
| 4,084,857 | 4/1978 | VanderVeen | 301/6 WB X |
| 5,002,342 | 3/1991 | Dyko | 301/6 WB |

*Primary Examiner*—Russell D. Stormer
*Attorney, Agent, or Firm*—Larry J. Palguta; Leo H. McCormick; Robert A. Walsh

[57] ABSTRACT

The wheel assembly hinged heat shield (10) comprises a plurality of arcuate sectors (12) which are attached firmly to one another by hinge mechanism (14). Each hinge mechanism (14) comprises arcuate shaped hinge members (18, 20, 22) of adjoining arcuate sectors (12) which receive therethrough an axial pin (24). The axial pin (24) has a cotter key (28) engaged therewith in order to capture axially the pin (24). The heat shield (10) is disposed within an aircraft wheel (30) such that when attachment mechanisms (37) are tightened to secure each arcuate sector (12) firmly to the wheel (30), the adjoining arcuate sectors (12) are each pulled circumferentially away from adjoining arcuate sectors (12) in order to effect a chordal tensioning therebetween. The chordal tensioning defines the critical radial positioning of sector interface regions comprising the hinge mechanism (14).

23 Claims, 3 Drawing Sheets

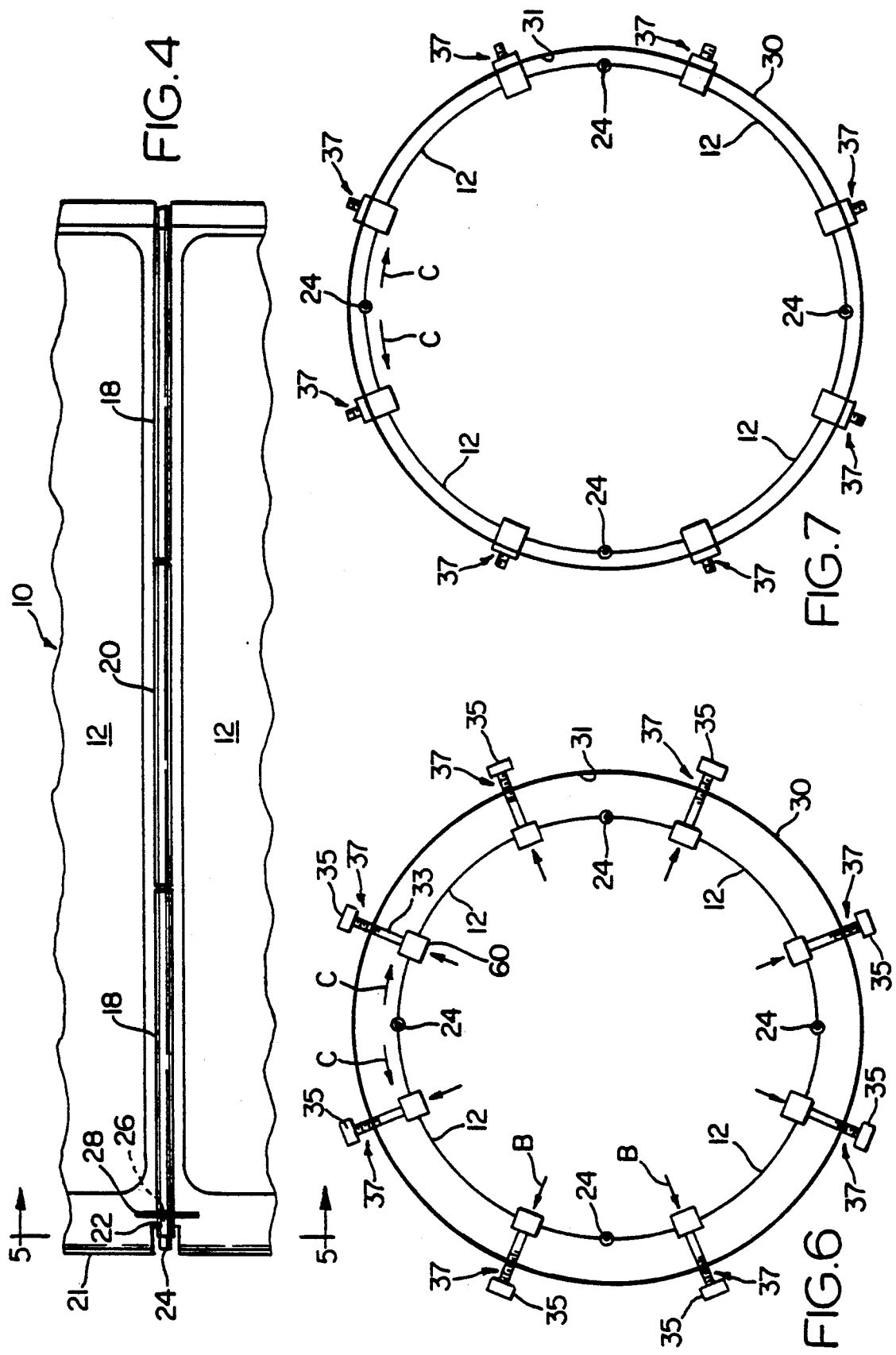

WHEEL ASSEMBLY HINGED HEAT SHIELD

The present invention relates generally to a heat shield for a wheel, and in particular to a heat shield for an aircraft wheel and brake.

Aircraft braking systems typically comprise a plurality of discs alternately connected to the wheel and axle of the aircraft The urging together of the cylindrical stack of discs achieves the braking function. However, the successful development of carbon discs or carbon-carbon composite discs for aircraft brakes has significantly elevated the operating temperatures of the wheel and brake assembly. A multilayer annular wheel shield composed of several co-axial cylindrical foils of high reflectance and separated by low conductant spacers has performed very well. However, this type of prior wheel heat shield has its shortcomings. The shortcomings are its large size which requires substantial storage space, and its vulnerability to local damage which requires that the entire heat shield be replaced. As a result, such a heat shield, while operationally effective, is costly. Therefore it is highly desirable to provide a multilayer heat shield structure which is shaped like a drum and made from a number of segments. The number and size of the segments are designed in accordance with the size of the components of the wheel and brake. It is highly desirable that the heat shield be provided in separate individual components so that they can be easily stacked and stored with a minimal requirement of storage space. The heat shield should be easily assembled within the wheel such that at final assembly its position relative to the wheel is determined and will remain relatively unchanged. If the heat shield should become damaged, it is desirable that only the damaged segment or segments be easily disconnected, removed and replaced with new segments, rather than having to disconnect and replace the entire heat shield.

The present invention provides solutions to the above problems by providing a heat shield for a wheel, comprising a cylindrical member formed from a plurality of arcuate sectors, each arcuate sector being securely interconnected with an adjoining arcuate sector by hinge means for effecting said interconnection, wherein each lateral end of said arcuate sectors is secured to a lateral end of an adjoining arcuate sector by the respective hinge means.

The invention is described in detail below with reference to the drawings which illustrate an embodiment in which:

FIG. 4 is a partial top view of adjoining arcuate sectors of the heat shield;

FIG. 5 is an axial end view of adjoining arcuate sectors of the heat shield; and FIGS. 6 and 7 are schematic illustrations of the method of attaching the arcuate sectors to the wheel.

Figure 1:
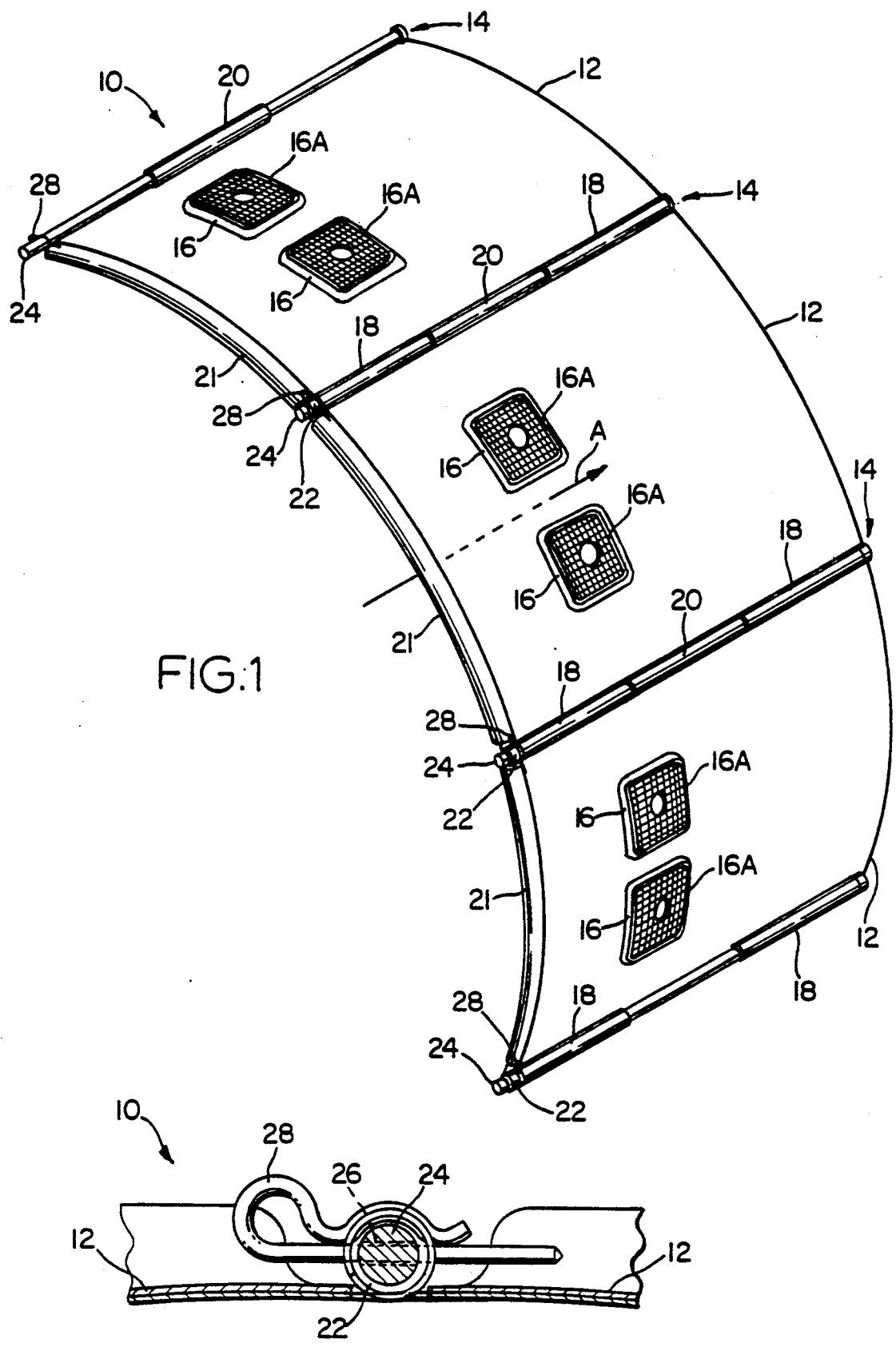
FIG. 1 is a isometric and schematic illustration of a portion of the hinged heat shield of the present invention.

FIG. 1 is an isometric and schematic illustration of the heat shield of the present invention and designated generally by reference numeral 10. Heat shield 10 comprises a plurality of arcuate sectors or concentric cylindrical members 12 which are firmly interconnected with one another by hinge means 14 with an interconnecting means or pin 24. Each arcuate sector 12 includes a pair of recessed areas 16 for engaging firmly the associated wheel. The recessed areas 16 are recessed radially outwardly in the direction of Arrow A so that the top surface 16A engages the inner surface of the well of an associated wheel. Each arcuate sector 12 is composed of several coaxial cylindrical foils of high reflectance which are separated by low conductance spacers, as is well-known in the art. At one end of each sector 12 is any number of arcuate shaped hinge members 18 (a pair is illustrated) and at the opposite end of the respective sector is any number of arcuately shaped hinge members 20 (a single member is illustrated) which is received between the hinge members 18 of the adjoining sector. The hinge members 18 and 20 are of approximately equal axial lengths. Located adjacent axial edge 21 of each sector 12, and at one circumferential end thereof, is a short axial length arcuate shaped hinge member 22. The adjoining arcuate sectors 12 are connected firmly together by the interconnecting means comprising an axial pin 24 which is received within the arcuate shaped hinge members 18, 20 and 22. Connection means or cotter pin 28 is received through an opening 26 (see FIG. 5) in each pin 24. Cotter key 28 is captured axially between the axially adjacent hinge members 22 and 18 so that pin 24 is captured axially within hinge members 18, 20 and 22.

Figure 2:
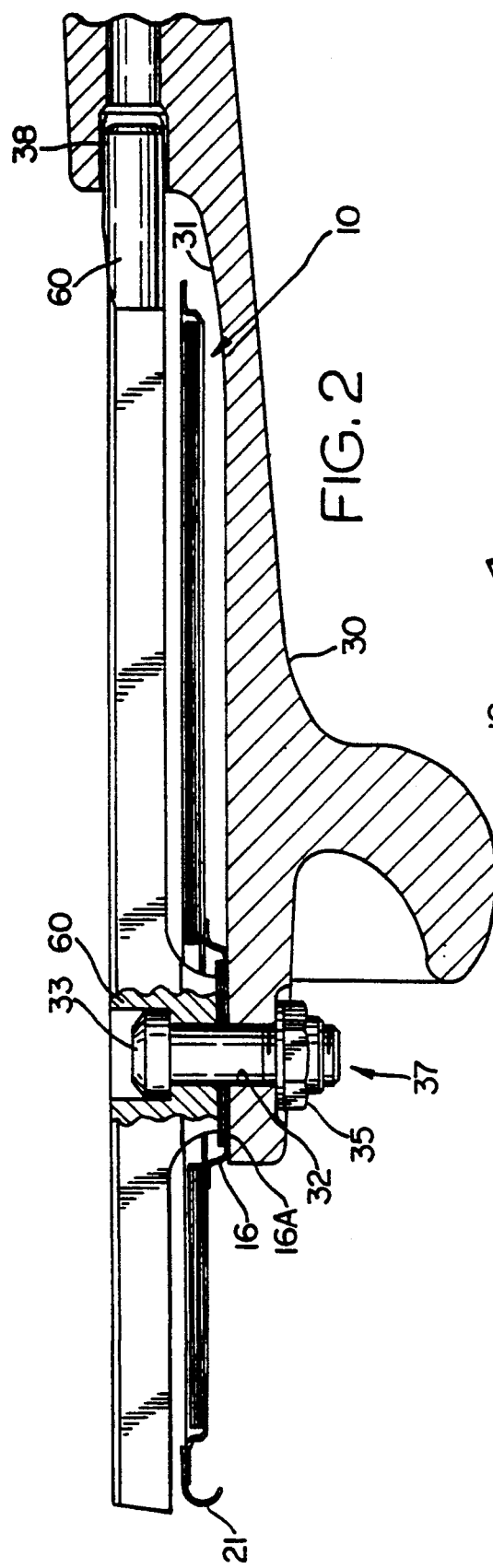
FIG. 2 is a section view of a portion of an aircraft wheel with the heat shield attached thereto.

Referring now to FIG. 2, a partial section view of an aircraft wheel 30 with heat shield 10 connected therewith is illustrated. Wheel 30 includes a plurality of circumferentially spaced apart radial openings 32 which receive bolts 33 that, when tightened by nuts 35, secure the drive keys 60 to wheel 30. A plurality of drive keys 60 are located circumferentially about inner wheel well 31 of wheel 30, such that one end of each key 60 is captured within opening 38 and the other end is secured to the wheel by the bolt 33 and nut 35. Heat shield 10 is also secured to wheel 30 by means of the bolt 33, drive key 60 and nut 35 combination. Drive key 60 is received within recessed area 16 such that it causes surface 16A to engage firmly tube well surface 31.

Figure 3:
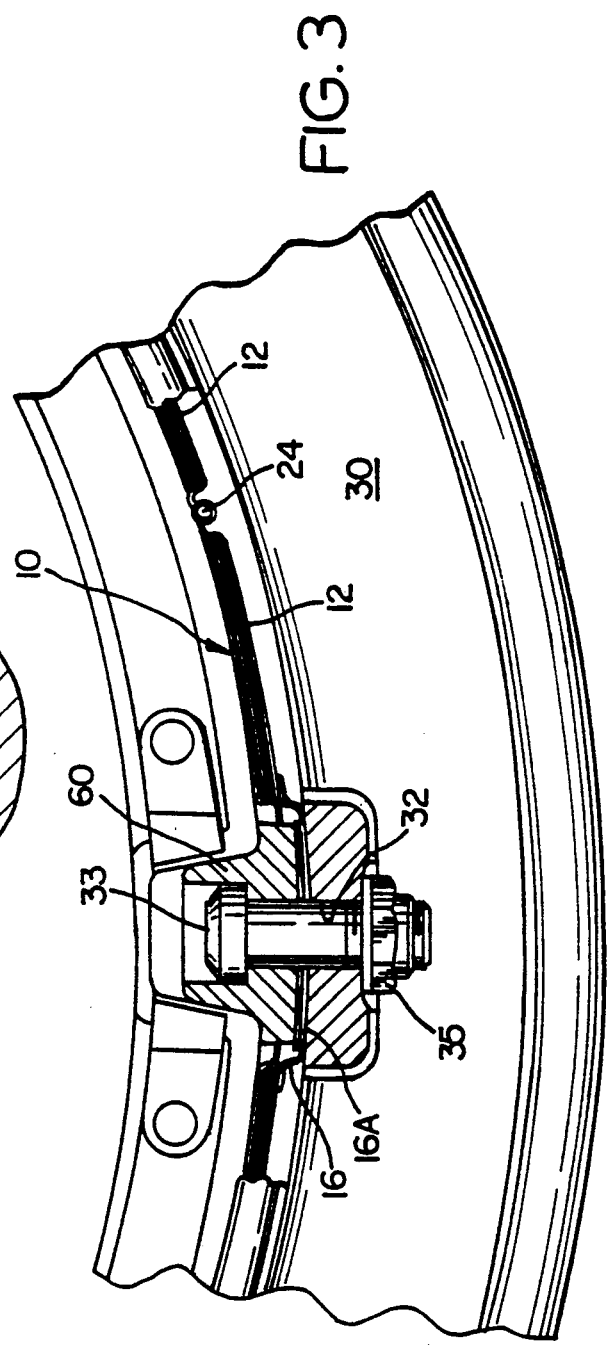
FIG. 3 is a end partial section view of an aircraft wheel with the heat shield attached thereto.

FIG. 3 is a partial section end view of wheel 30 with heat shield 10 connected therewith by the bolt 33, drive key 60, and nut 35 combination comprising an attachment means 37. Connecting pin 24 is received between arcuate shaped hinge members 18, 20 and 22 so that sectors 12 are connected firmly with one another.

FIG. 4 is a partial top view of two adjoining sectors 12 and arcuate shaped hinge members 18, 20 and 22. Connection means or cotter key 28 is received through pin opening 26 so that pin 24 is held axially in position relative to heat shield 10. FIG. 5 is an enlarged end view of cotter key 28 received in pin opening 26 of the pin 24.

The heat shield of the present invention may be stored in stacked-together sectors so that very little storage space is required. When the heat shield is to be assembled within a wheel, arcuate sectors 12, pins 24 and cotter pins 28 are utilized in conjunction with the attachment means 37 comprising bolts 33, drive keys 60 and nuts 35. As illustrated schematically in FIG. 6, arcuate sectors 12 would each be attached loosely by way of the attachment means 37 (bolts 33, drive keys 60, nuts 35) to wheel 30. The attachment means 37 also retains the components comprising the drive keys 60 which are shown schematically as blocks in FIG. 6 for purposes of clarity. Each of the arcuate segments 12 has an arcuate shape that does not conform to the cylindrical shape of tube well 31 of wheel 30. While the respective sectors 12 are connected loosely with the untightened attachment means 37, the adjacent hinges 18, 20 and 22 of the adjacent sectors are aligned and pins 24 inserted therethrough. Cotter keys 28 are then inserted through pin openings 26 so that the pins will remain axially positioned relative to heat shield 10. Then each of the attachment means 37 is tightened by way of advancing the respective nuts 35 along the associated bolts 33. This moves arcuate sectors 12 in the direction of Arrows B in FIG. 6. As sectors 12 are connected firmly with tube well surface 31 of wheel 30, the ends of adjoining sectors 12 are moved circumferentially away from one another in the direction of Arrows C. Thus, when the attachment of sectors 12 to wheel 30 is completed, there is a circumferential or chordal tensioning in the direction of Arrows C (see FIG. 7) between each of the adjoining sectors 12 which now have an arcuate shape more closely akin to the cylindrical shape of the tube well surface 31. This chordal tensioning is important because it results in each of the sectors being positioned firmly within wheel 30 such that their positions are known and can be controlled throughout the use of the wheel and associated brake. Rather than having individual sectors 12 moving circumferentially relative to one another and obtaining different positions as the wheel and brake are being used, the operational positions of each of the sectors is effected and maintained in a controlled manner.

If any one or more of sectors 12 of heat shield 10 should become damaged during use of the wheel and associated brake, the damaged sector (or sectors) alone are very simply disconnected and easily replaced. Subsequent to removal of the wheel from the brake, the associated attachment means 37 are simply loosened and the nuts 35 removed therefrom so that the associated keys 60 can be removed from the wheel. When pairs of attachment means 37 are disconnected from the respective damaged sector(s) 12, the damaged sector(s) 12 and adjoining sectors will experience a relieving of the chordal tensioning (indicated previously by Arrows C in FIG. 7) so that pins 24 may be simply removed and the damaged sector(s) taken out of the wheel. A new sector(s) 12 would then be inserted according to the assembly method described above.

We claim:

1. A heat shield in combination with a wheel, comprising a plurality of concentric cylindrical members, means interconnecting said plurality of concentric cylindrical members such that they are securely fixed to one another, and attachment means connecting each of said concentric cylindrical members with said wheel, such that the attachment means connects each concentric cylindrical member firmly with said wheel and effects chordal tensioning between adjoining concentric cylindrical members.

2. The heat shield and wheel in accordance with claim 1, wherein each of said concentric cylindrical members includes at least two recessed areas which receive said attachment means.

3. The heat shield and wheel in accordance with claim 1, wherein the interconnecting means comprises hinge means each which includes a pin and hinge members at the cylinder members, the pin received between the hinge members of respective adjoining concentric cylindrical members.

4. A method for attaching a heat shield with a wheel, the heat shield comprising a plurality of concentric cylindrical members and means for interconnecting said plurality of concentric cylindrical members such that adjoining members are firmly connected together, and each of the concentric cylindrical members able to receive attachment means, comprising the steps of locating each of the plurality of concentric cylindrical members within the wheel and connecting each member loosely with the wheel by way of the attachment means, connecting together each of the adjoining concentric cylindrical members by disposing the interconnecting means therebetween, and tightening the attachment means to connect firmly each concentric cylindrical member with the wheel and effect a chordal tensioning between adjoining concentric cylindrical members as the members move circumferentially away from one another.

5. The method in accordance with claim 4, wherein the cylindrical members each have at least one recessed area which each receive the attachment means comprising a bolt, drive key and nut.

6. The method in accordance with claim 4, wherein the step of disposing the interconnecting means between the adjoining concentric cylindrical members includes a pin and hinge members and comprises the step of inserting the pin between hinge members of the respective adjoining cylindrical members.

7. The method in accordance with claim 6, further comprising the step of inserting connection means into engagement with said pin in order to limit axial movement of the pin.

8. The method in accordance with claim 7, wherein said hinge members comprise a relatively short axial length hinge member located adjacent an axial edge of said heat shield, and further comprising the step of trapping axially the connection means between the short length hinge member and an adjacent hinge member.

9. A heat shield for a wheel, comprising a cylindrical member formed from a plurality of arcuate sectors having respective lateral ends, each arcuate sector being securely interconnected with an adjoining arcuate sector by hinge means for effecting said interconnection, wherein each lateral end of said arcuate sectors is secured to a lateral end of an adjoining arcuate sector by the respective hinge means, and said hinge means comprises a pin and hinge members at the arcuate sectors, the pin extending through the hinge members of the respective adjoining arcuate sectors.

10. The heat shield in accordance with claim 9, wherein each arcuate sector includes at least one recessed area for receiving mounting means which mount the arcuate sectors with the wheel.

11. The heat shield in accordance with claim 9, wherein each sector is multilayered.

12. The heat shield in accordance with claim 9, wherein the hinge members each have an approximately equal axial length.

13. The heat shield in accordance with claim 12, further comprising a hinge member having a short axial length and located adjacent an axial edge of said heat shield.

14. The heat shield in accordance with claim 13, further comprising connection means engaging said pin and captured axially between said short hinge member and an adjacent hinge member.

15. The heat shield in accordance with claim 14, wherein said connection means comprises a cotter key.

16. A heat shield for a wheel, comprising a cylindrical member formed from a plurality of arcuate sectors having respective lateral ends, each arcuate sector being securely interconnected with an adjoining arcuate sector by hinge means for effecting said interconnection independently of said wheel, wherein each lateral end of said arcuate sectors is secured to a lateral end of an adjoining arcuate sector by the respective hinge means.

17. The heat shield in accordance with claim 16, wherein each arcuate sector includes at least one recessed area for receiving mounting means which mount the arcuate sectors with the wheel.

18. The heat shield in accordance with claim 16, wherein each sector is multilayered.

19. The heat shield in accordance with claim 16, wherein said hinge means comprises a pin and hinged members at the arcuate sectors, the pin extending through the hinge members of the respective adjoining arcuate sectors.

20. The heat shield in accordance with claim 19, wherein the hinge members each have an approximately equal axial length.

21. The heat shield in accordance with claim 20, further comprising a hinge member having a short axial length and located adjacent an axial edge of said heat shield.

22. The heat shield in accordance with claim 21, further comprising connection means engaging said pin and captured axially between said short hinge member and an adjacent hinge member.

23. The heat shield in accordance with claim 22, wherein said connection means comprises a cotter key.

* * * * *